May 5, 1959 P. J. NATHO 2,885,172
SAFETY VALVE WITH MECHANICAL AND HYDRAULIC OPERATOR
Filed July 17, 1956 5 Sheets-Sheet 1

May 5, 1959

P. J. NATHO 2,885,172

SAFETY VALVE WITH MECHANICAL AND HYDRAULIC OPERATOR

Filed July 17, 1956

Inventor
Paul J. Natho
By Everett A. Johnson
Attorney

May 5, 1959 P. J. NATHO 2,885,172
SAFETY VALVE WITH MECHANICAL AND HYDRAULIC OPERATOR
Filed July 17, 1956 5 Sheets-Sheet 3

Inventor
Paul J. Natho
By Everett A. Johnson
attorney

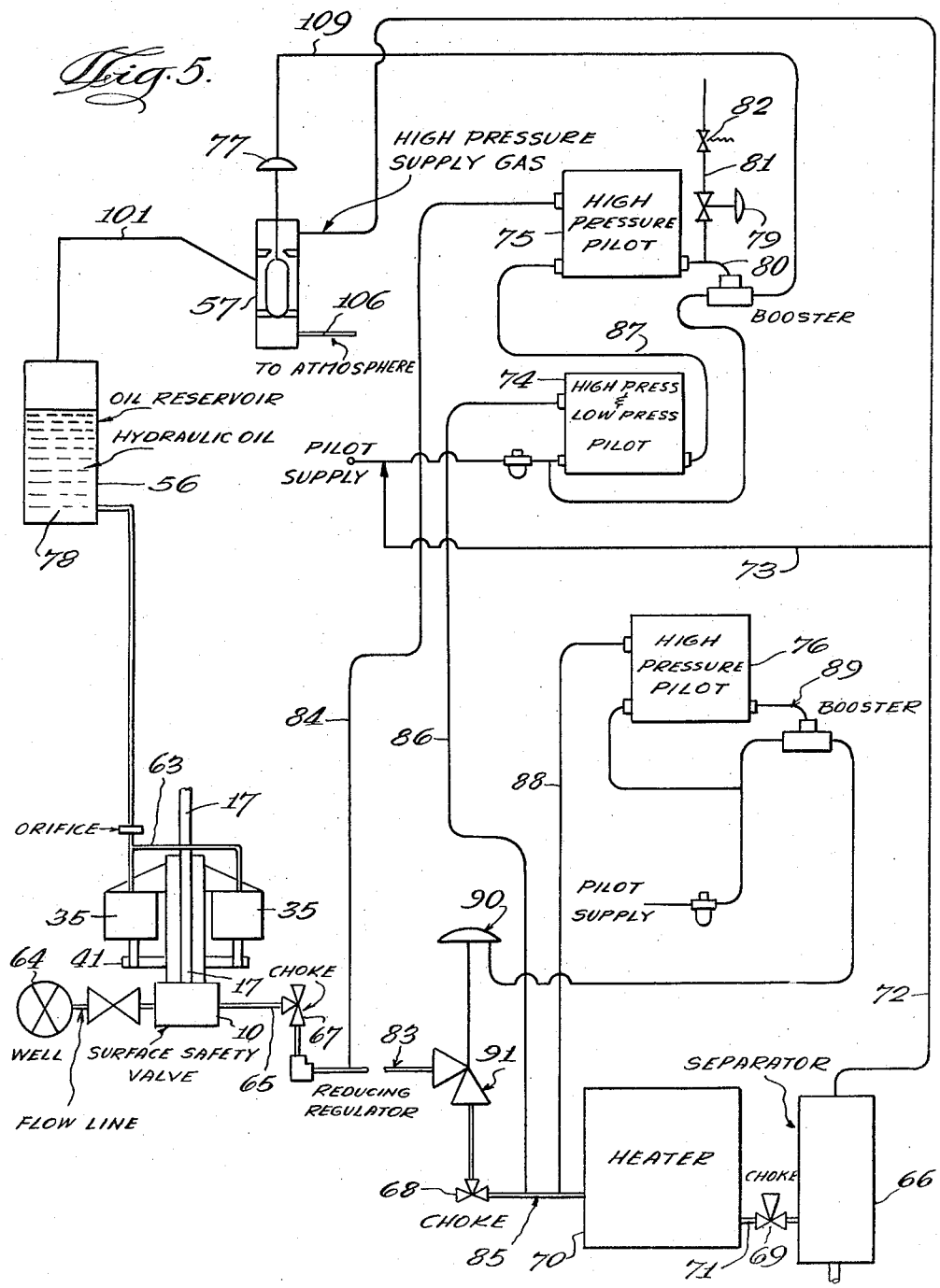

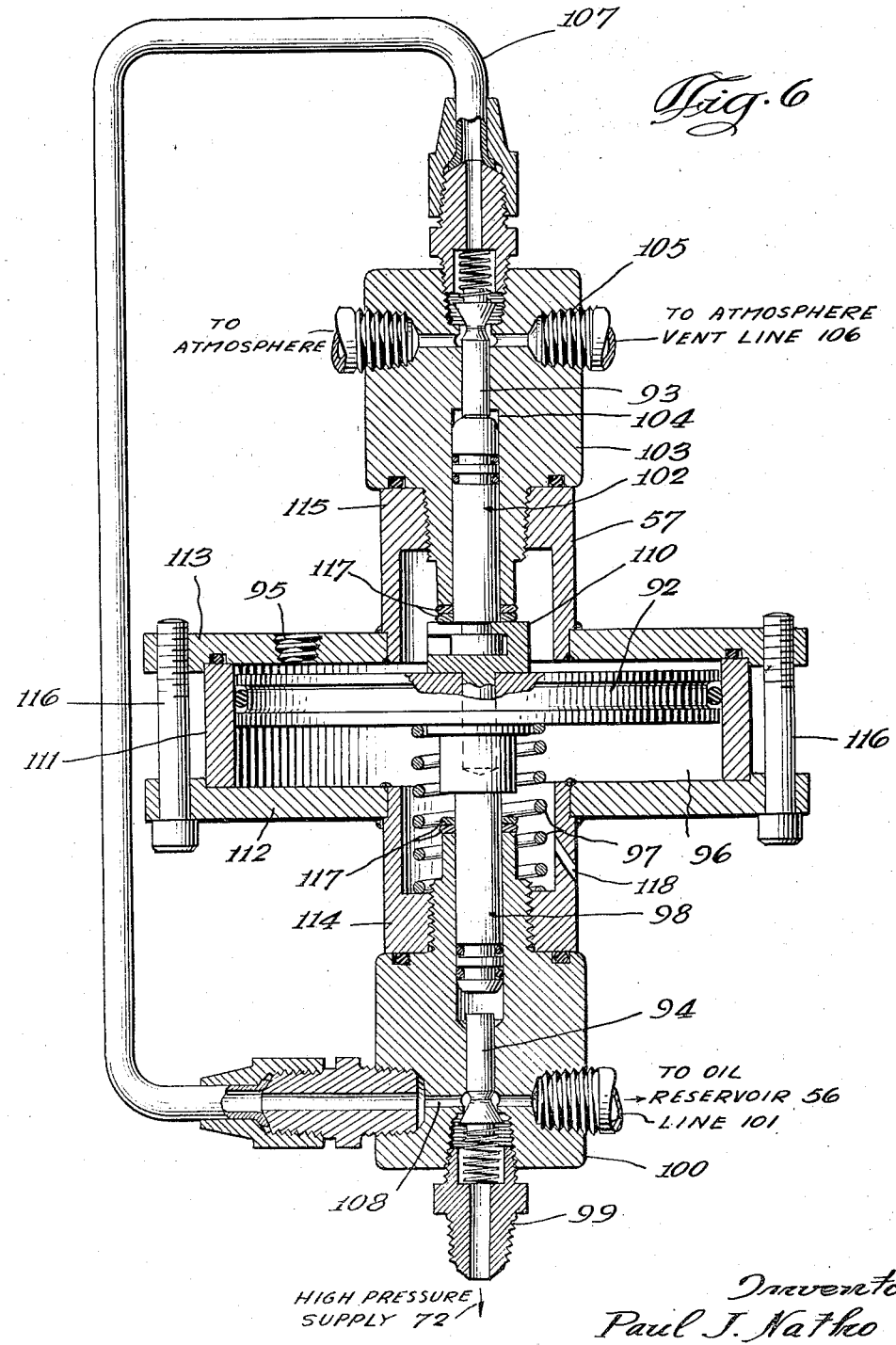

United States Patent Office 2,885,172
Patented May 5, 1959

2,885,172

SAFETY VALVE WITH MECHANICAL AND HYDRAULIC OPERATOR

Paul J. Natho, Houston, Tex., assignor to Pan American Petroleum Corporation, a corporation of Delaware Application July 17, 1956, Serial No. 598,297

5 Claims. (Cl. 251—14)

This invention relates to improvements in safety valves and more particularly relates to the use of such valves on high pressure lines.

Valves of this type are intended for use as a surface safety valve in connection with a flowing oil or gas well. It is ordinarily placed within the well head connections and the well is produced through the safety valve. However, valves of designs heretofore proposed have not been entirely satisfactory in all respects. For example, one form of safety valve which employs many desirable features is inadequate for many uses because if it should fail, it fails open.

It is, therefore, a primary object of my invention to provide a valve structure which fails shut. Another object of the invention is to provide means for remotely controlling the operation of such valve. A further object of the invention is to provide a valve structure wherein the pressure of the line controlled is effective in closing the valve in the event of a failure. Another object of the invention is to provide an operator for a high pressure safety valve which includes integrated hydraulic and mechanical means. Still another object of the invention is to provide a reverse action valve which is foolproof in operation and of simple mechanical construction. A further object of the invention is to provide a gate member for use on a self-rising stem which has a lower blind and an upper flow port whereby the gate member fails closed. These and other objects of the invention will become apparent as the more detailed description thereof proceeds.

In general I attain the objects of my invention by providing hydraulically operated surface safety valves for use on high pressure fluid lines which employ a fail-closed gate member which has a lower blind and an upper flow port; the gate member is operable by a self-rising stem which in turn is positioned by a hydraulic operator in opposition to the reverse action provided by the pressure of the line under control.

For the purpose of providing a means of obtaining pressure in a vessel such as an oil-gas separator during the starting up period, which vessel will in turn provide pressure to the hydraulic operator, I provide a mechanical opening assembly including a hand wheel, screw stem, and a latch carrier having spring-loaded latches. The screw stem is detachably fixed to the valve stem so that the hydraulic operator means can take over when suitable pressure is available.

With this arrangement, the self-closing fail-shut valve can be opened at will, either mechanically or hydraulically. The pressure within the valve body is the only closing force provided. Hence, the valve can be opened either mechanically or hydraulically but not simultaneously by both means.

Further details of construction and advantages of my invention will be described by reference to a preferred embodiment of the invention illustrated in the drawings and wherein:

Figure 5 is a schematic showing of a typical installation embodying the valve illustrated in Figures 1 to 4; and Figure 6 is an elevation, partly in section, of an automatic 3-way valve which may be used in the installation of Figure 5.

Figure 1:
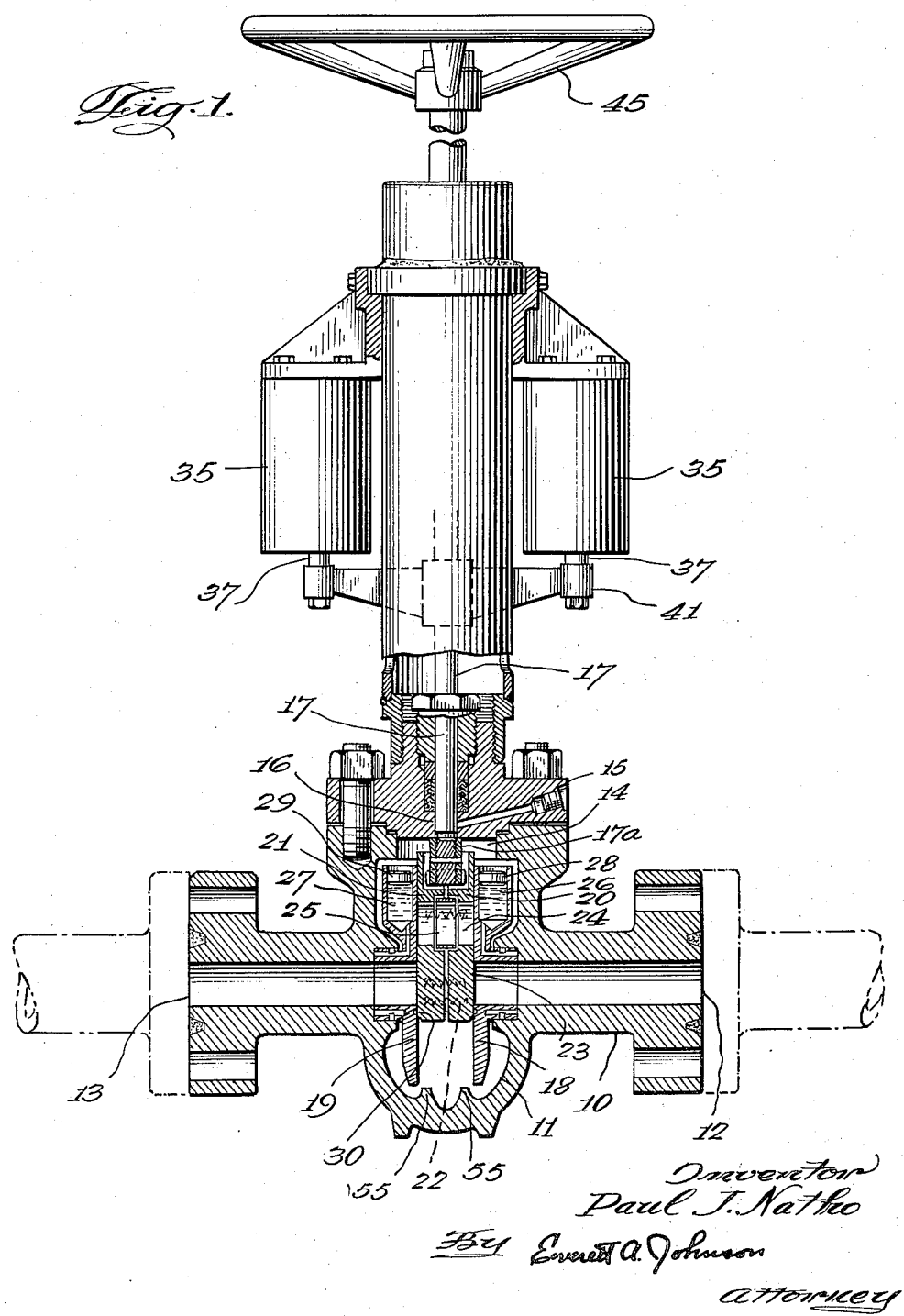
Figure 1 is an elevation, partly in section, illustrating the fail-closed gate member with the self-rising stem.

Referring to the drawing, the valve 10 comprises a hollow body 11 having inlet and outlet openings 12 and 13 for the flow of fluid therethrough and a top opening 14 through which the valve components may be introduced. The top opening 14 is closed by a bonnet 15 bolted to the body 11. A passage 16 is provided through the bonnet 15 within which is disposed the valve stem 17.

Within the valve housing 11 and secured to the inlet and outlet openings 12 and 13, I provide the valve seats 18 and 19. Between the valve seats 18 and 19 are the valve gates 20 and 21 which are pressed toward the adjacent seats and from each other by springs 22. The valve gates 20 and 21 are provided with the blinds 23 and the flow ports 24. A ring 25 aligned with the flow ports 24 is disposed between the gates 20 and 21.

In the upper portion of the body 11 is provided a pair of reservoirs 26 and 27 open at their tops to admit pressure which may be applied to the gate chamber from the high pressure side of the valve. This pressure is exerted on the top of the piston plugs 28 and 29 which are slidably arranged in each of the reservoirs 26 and 27. With a pressure differential across the piston plug 28, sealing lubricant is fed from the reservoir 27 into the sealing groove 30 about the gate member 21.

When the hydraulic pressure is removed from one or more operating cylinders 35 the pressure within the valve body 11 acts on the valve stem 17 causing same, crossbar 41, piston rods 37, and pistons 36 to travel upwardly thereby moving valve gates 20 and 21 by means of joint 17a until the blinds 23 are in register with the valve seats 18 and 19 whereby the valve 10 is normally maintained in closed position.

When the valve 10 is closed, the stem 17 is in an outward position and, conversely when the valve 10 is in the open position the stem 17 extends inwardly of the bonnet 15 and into the valve body 11. When in the closed position (as shown in Figure 1) the brackets 40 attached to the crossbar 41 hold the push rods 42 in a position such that when the latch carrier 43 is advanced inwardly toward the valve body by counterclockwise rotation of the screw stem 44 and handwheel 45, springs 46 contact plate 47 which in turn transmits a force on latches 48. Counterclockwise rotation of hand-wheel 45 is stopped when the latch carrier 43 engages shoulder 49.

Figure 2:
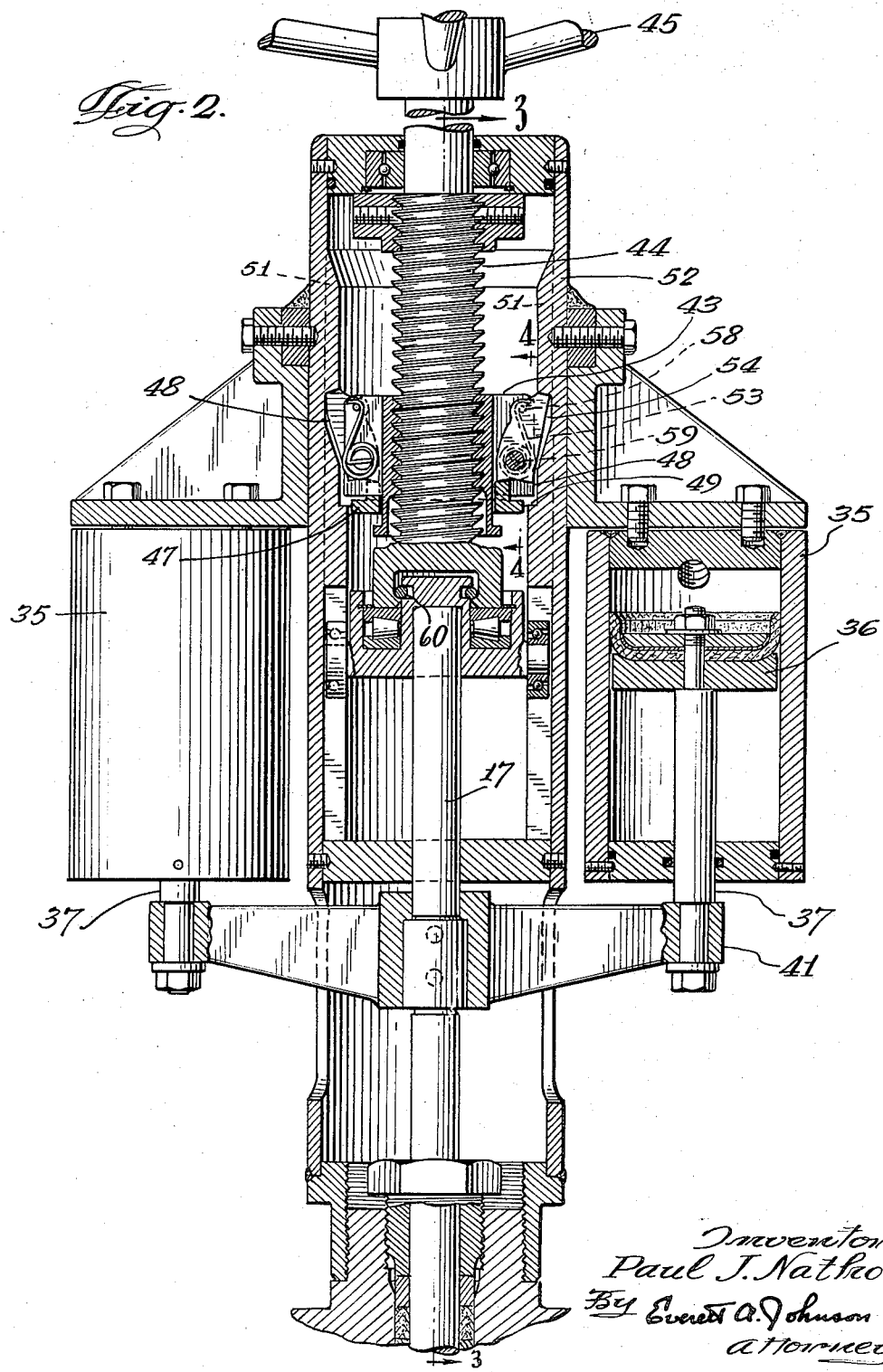
Figure 2 is an elevation, partly in section, showing details of the mechanical and hydraulic operator.

During this counterclockwise rotation, the latch carrier 43 cannot rotate inasmuch as the key 50 of latch carrier 43 engages the slots 51 in the wall of the casing 52. The force exerted by the springs 46 on plate 47 is sufficient to override the force exerted by springs 53 and, therefore, latches 48 are expanded into the recesses 54 (Figure 2).

Once the latches 48 are expanded into the recesses 54, they are retained in position by virtue of the pressure on them by latch carrier 43 and the angle of contact of latches 48 in recess 54 when the handwheel 45 is rotated clockwise to move the screw stem 44 forward, i.e. toward the valve body 11. The clockwise rotation of the handwheel 45, therefore, results in an inward movement of the valve stem 17 to depress the valve gate 20—21 and bring the flow port 24 into its open position. Clockwise rotation of the handwheel 45 can continue until the valve 10 is fully open, and stops 55 within the valve body 11 restrict further movement.

Pressure within the valve body 11 always exerts an outward force on the valve stem 17 and tends to close the valve 10. Therefore, with pressure in the valve body 11 and no pressure in the oil reservoir 56, the valve 10 will close whenever the handwheel 45 is again rotated in a counterclockwise direction during the mechanical operation.

The principal purpose of the mechanical opening assembly including the handwheel 45, the screw stem 44 and the latch carrier 43 with its spring-loaded latches 48 is to provide a means of obtaining pressure in a vessel such as an oil-gas separator during the starting-up period, which vessel will in turn provide pressure to the oil reservoir 56. However, if it is elected to provide hydraulic pressure by means of a suitable pump, the mechanical operating assembly can be omitted. Hence, the valve can be opened either mechanically or hydraulically but not simultaneously by both means.

Figures 3, 4:
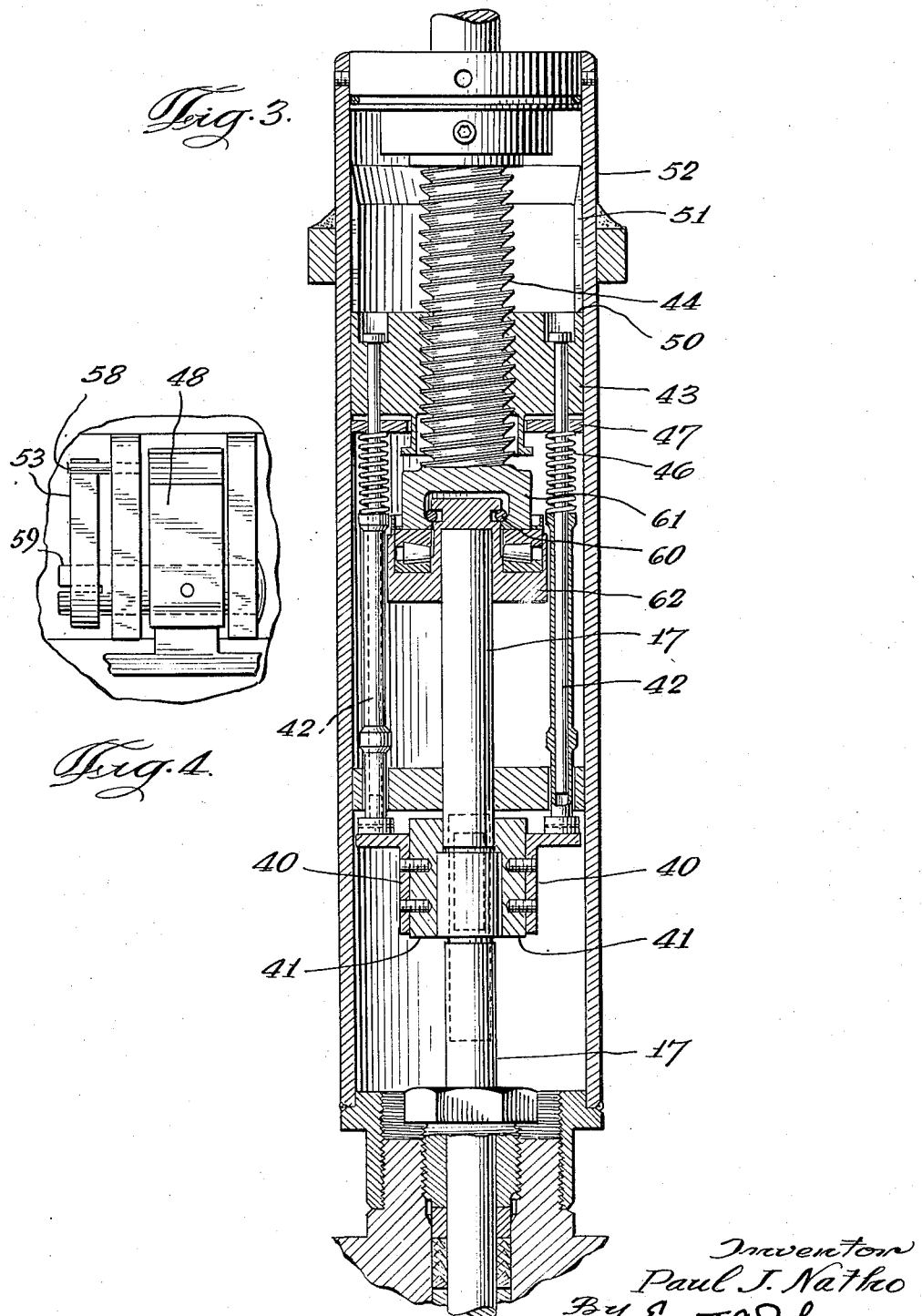
Figure 3 is a section taken along the line 3—3 in Figure 2.
Figure 4 is a fragmentary section taken along the line 4—4 in Figure 2.

Reverting to the mechanical operation, when pressure is applied to the oil reservoir 56 with the valve 57 fully open, the valve 10 will remain open even though the handwheel 45 is rotated in a counterclockwise direction. As soon as the handwheel 45 is rotated slightly in a counterclockwise direction, pressure is removed from the faces of the latches 48 and they retract because latch springs 53 are no longer overridden by springs 46 inasmuch as the brackets 40 are not in contact with push rods 42. It will be noted that the outer ends of latch spring 53 is anchored to the latch carrier 43 by a pin 58 and, therefore, it retracts the latch 48 through the latch shaft 59 which is keyed to the latch 48 (Figure 4). Once the latches 48 retract, they cannot again be expanded into the recesses 54 unless the valve 10 is in a closed position with pressure removed from the oil reservoir 56 and the handwheel 45 is again rotated counterclockwise to its most remote position.

Snap ring 60 carried by the upper end of the valve stem 17 and the lower end of the screw stem 44 assures the inward movement of the latch carrier 43 toward the valve body to release and retract the latches 48 whenever pressure is applied to the oil reservoir 56 and the valve 10 has been only partially opened by the handwheel assembly.

The hydraulic operation of the valve 10 is possible at all times regardless of the position of the handwheel 45 and latch carrier 43 inasmuch as the latches 48 are released as soon as hydraulic operation is begun. This is possible because the screw stem end 61 and the the bearing carrier and stem guide 62 at the top of valve stem 17 separate at the snap ring 60 thus enabling the free travel of the valve stem 17 as controlled by the hydraulic cylinders 35 through crossbar 41.

If pressure is applied to the oil reservoir 56 and the valve 10 is held open, the latches 48 will automatically retract. This is brought about by latch springs 53 which are no longer overridden by springs 46. Snap ring 60 assures the downward movement of the latch carrier 43 whenever the valve stem 17 moves inwardly of the body. Should pressure be applied to the oil reservoir 56 with the mechanism in place as illustrated by the drawing snap ring 60 would be compressed and screw stem end 61 and the bearing carrier and stem guide 62 will part thus permitting the free travel of the valve stem 17. Latches 48 can only be engaged in recesses 54 when the valve 10 is in a closed position.

With this arrangement, the valve 10 can be opened at will either mechanically or hydraulically. Pressure within the body 11 of the valve 10 is the only closing force provided. However, reverse pistons (not shown) in the cylinders 35 can be provided to accomplish this if desired.

An orifice or a combination orifice check valve in the hydraulic manifold 63 connecting the two cylinders 35 can be provided to prevent instantaneous closing of the valve 10 upon release of pressure in oil reservoir 56.

In Figure 5 I have illustrated a typical hookup for controlling high pressure gas well. During production of gas and/or oil from a well 64 the reverse action valve 10 is in an open position (stem 17 in), being so held by the two hydraulic cylinders 35 through the action of crossbar 41 on the valve stem 17.

The hydraulic cylinders 35 in turn are activated by hydraulic pressure in manifold 63 obtained from a supply of hydraulic oil contained in an oil reservoir 56 to or from which gas can be applied or released in order to obtain the desired condition.

By way of explanation the gas pressure applied to the oil reservoir 56 must be approximately 500 p.s.i. with a pressure in flow line 65 of about 10,000 p.s.i. and it can be obtained from the separator 66 normally operating at 1,000 p.s.i. or higher to meet transmission line requirements. Should gas at this pressure be unavailable from the separator 66 during well testing and other related operations, it can be obtained for emergency and short time operation from a nitrogen cylinder and other portable sources.

The hookup for a 10,000 p.s.i. well includes several pressure control points as indicated diagrammatically in Figure 5. To prevent severe erosion on the downstream side of a choke 67 or within the choke 67 itself, the pressure drop across it is limited by installing several chokes 67, 68 and 69 in series and by proper selection of their sizes distribute the pressure drop equally or approximately equally from each choke.

All pressure reduction above 4,000 p.s.i. can be accomplished with a choke without the benefit of external heat to prevent freezing, therefore, it is of advantage to take all pressure drop in the flow line before entering the coils of heater 70 which are generally the weakest point within the well hookup. The well fluids from the heater 70 pass by conduit 71 through choke 69 into separator 66. The high pressure gas from the separator 66 is transferred by conduit 72 to the spring-loaded valve 57. A portion of the high pressure gas may be diverted by line 78 as the pilot supply to the high and low pressure pilot 74.

To insure the operation of the system with the desired pressure drops across individual chokes 67, 68 and 69 and a safe working pressure in the hydraulic system, controllers 74, 75 and 76 are installed within the system. Thus whenever pressure conditions are not within the prescribed limits, the well 64 is shut in by means of the reverse action valve 10. This is accomplished by having the pilot pressure controllers 74, 75 and 76 interrupt and bleed the pressure from the diaphragm 77 of a small three-way valve 57 which applies or releases the 500 p.s.i. pressure to or from the oil 78 in the oil cylinder 56, as described above. The pressure supply for these pilot pressure controllers 74, 75 and 76 is likewise obtained from the the 1,000 p.s.i. separator 66.

This system can be utilized either with automatic or manual reset. Manual reset is accomplished by means of a small spring-load valve 79 which is held closed by the output pressure from the pilot pressure controllers 74 and 75 acting on the area of the valve 79. When the output pressure is bled off, the spring opens the valve 79 and henceforth releases all output pressure from conduit 80 to the atmosphere via line 81 thereby preventing the automatic reopening of the reverse action valve 10 by way of the high pressure oil reservoir 56. Valve 82 must then be manually closed until the output pressure from pressure controllers 74 and 75 can be restored in conduit 80 to close valve 79 thereby applying pressure to diaphragm 77 to open three-way valve 57.

The functions of pressure controllers 74, 75 and 76 in the well hookup are as follows:

When pressure in conduit 83, transmitted to controller 75 through conduit 84, exceeds the set pressure of controller 75, the controller mechanism bleeds to the atmosphere, the pressure in conduit 80 thereby removing the pressure from diaphragm 77 thus closing three way valve 57, which in turn closes valve 10. When the pressure in conduit 85, transmitted to controller 74 through conduit 86, exceeds the set maximum pressure or drops below the set minimum pressure of controller 74, the controller mechanism bleeds the pressure to the atmosphere from conduit 87 and from conduit 80 through controller 75 thereby causing valve 10 to close as described above. Similarly, when the pressure in conduit 85, transmitted to controller 76 through conduit 88, exceeds the set pressure of controller 76, the controller mechanism bleeds the pressure to the atmosphere which results in decreasing the pressure in conduit 89 and on diaphragm 90 of pressure regulator 91. This reduction of pressure causes regulator 91 to operate so as to reduce the pressure in conduit 85.

If the well is flowing and conditions arise at the control point which would require the controller to close the valve 10, the controllers 74 and 75 bleed the pressure from the diaphragm of three-way valve 57. The three-way valve 57 then releases the high pressure gas from the oil reservoir 56 which in turn releases the cylinder pressure from the valve operating cylinder 35. Pressure within the valve body 11 acts on the valve stem 17 and moves the valve gates 20—21 outwardly to a closed position with the stem 17 out.

Referring to Figure 6 I have illustrated a preferred form of the three-way non-mixing valve 57 employed in Figure 5. This is a piston-operated valve and is designed for high pressure service, i.e., 2500 pounds or more but is operated by the 15 to 30 pound output pressure from the pressure controller of the control system illustrated by Figure 5. It is used to impose or remove gas pressure from the separator on the oil reservoir 56 to operate the safety valve 10 and may also be described as a pressure relay or booster relay.

In Figure 6 the valve 57 is shown in its normal position with no pressure exerted on the piston 92. In this position, the vent valve 93 to the atmosphere is open and pressure supply valve 94 is closed so that all gas pressure is removed from the oil reservoir 56 of the safety valve operating system.

Whenever 15 to 30 p.s.i. pressure is applied to piston 92 through connection 95, the piston 92 moves downward within chamber 96 compressing spring 97 about the plunger 98, closing valve 93 and opening valve 94 through the action of plunger 98 thereby applying pressure from the separator 66 which is connected by conduit 72 to the fitting 99. The valve chamber 100 is in turn connected to the hydraulic system including oil reservoir 56 by line 101.

Whenever pressure is removed from the piston 92 the spring 97 returns it to its normal position, thereby removing the gas pressure from the oil reservoir 56 by closing valve 94 and opening valve 93 through the action of plunger 102. The lengths of plungers 98 and 102 are such that valve 94 must close before valve 93 is opened and valve 93 must close before valve 94 is opened thereby providing the non-mixing feature.

The valve chamber 103 is provided with a longitudinal bore 104 which accommodates the plunger 102 which is secured at its lower end to the piston 92. A tap 105 in the valve chamber 103 provides venting to the atmosphere by means of vent line 106. Spring-load valve 93 controlled by pressure line 107 is normally seated and is displaced by the upper travel of the plunger 102.

The high pressure valve block 100 is provided with spring-loaded valve 94 which likewise is normally seated and is displaced by the downward travel of plunger 98. The line 107 in turn is connected to a flow channel 108 in the valve block 100 and fitting 99 is connected to the high pressure gas supply line 72.

The valve structure will operate at any pressure so long as spring 97 is of sufficient strength to overcome friction only since all forces due to pressure are equalized. The ratio of the area of the piston 92 to the lower plunger 98 (approximately 100:1) is great enough to permit a controlled pressure of 30 pounds in line 109 through connector 95 to displace valve 94 from its seat against a supply pressure in conduit 72 of 2500 p.s.i. or more. When controller pressure supplied by line 109 is removed from piston 92 the pressure on lower plunger 98 exerts sufficient force on piston 92 and upper plunger 102 to push vent valve 93 off its seat.

The vent valve plunger 102 is attached to piston 92 by means of a flexible connection 110 which permits misalignment of the various parts without impairing the operation of the valve.

The operating cylinder 111 comprises a short cylinder closed at both ends by flange plates 112 and 113, each having an internal threaded boss 114 and 115 adapted to receive the vent valve block 103 and the high pressure valve block 100. The flange closure plates 112 and 113 are connected to each other by tie bolts 116. Suitable O-ring seals and spacer washers 117 can be provided as is well known in the art.

The top flange plate 113 is provided with a drilled and tapped bore 95 for connection to the pressure controller line 109. A vent 118 is provided for venting the cylinder 111 below the piston 92. If desired this vent 118 may be connected to an expandable bellows chamber (not shown) of such capacity as to permit the venting and acting as a transducer to indicate and/or record the position of valves 93 and 94 as indicated by the displacement of the piston 92.

Although the invention has been described with reference to preferred embodiments thereof, it is to be understood that these are by way of illustration only. As an example, although the operation of the safety valve has been described as being responsive to unusual pressure changes within the well hookup, other controllers responsive to unusual wind velocity, atmospheric temperature or pressure as in the case of offshore operations, controllers responsive to unusual wave action can be provided for automatically closing the safety valve. Accordingly, it is contemplated that modifications and variations can be made in the apparatus by those skilled in the art in light of the preceding description and without departing from the spirit and scope of the invention.

What I claim is:

1. A self-closing fail-shut valve which may be opened at will by mechanical and by hydraulic means alternatively, the combination which comprises valve body means, a flow channel traversing said valve body means, a movable gate member having a lower blind portion and an upper flow port, a valve stem fixed to said gate member and extending upwardly from said valve body with a fluid pressure responsive area exposed to the pressure in said valve body, hydraulic operator means fixed to said valve stem exterior of said valve body and adapted to move said valve stem inwardly of said body thereby to position said flow port in alignment with said flow channel, screw stem means detachably fixed to said valve stem, latch carrier means movable longitudinally of said valve stem and fixed against rotation in said body, a threaded bore through said latch carrier means, said bore accommodating said screw stem turning within said bore, and releasable spring-loaded latch means mounted in said latch carrier.

2. A safety valve with mechanical and hydraulic operator means for use on a self-closing fail-safe valve assembly, the improvement which comprises a valve body, a flow channel through said valve body, a gate member having a lower blind and an upper flow port, a self-rising stem which is fixed to and moved with said gate member for positioning said gate member relative to said flow channel, said self-rising stem having a fluid pressure responsive area exposed to the pressure in said body, hydraulic operator means adapted to actuate said stem in opposition to the upward force produced on said self-rising stem by pressure in said valve body, said hydraulic operator means including a pair of hydraulic cylinders, a piston in each of said cylinders, and bracket means fixed to said self-rising stem and connected to said pistons whereby the application of hydraulic pressure to said piston moves said stem and said gate member inwardly to align said flow port with said flow channel, a screw stem detachably fixed to the outer end of said valve stem, threaded block means within which said screw stem operates, said threaded block means being anchored against rotation in said assembly and being provided with releasable latch means to restrain said block against outward travel, and latch release means automatically actuated when the hydraulic operator means is functioning.

3. A safety control valve for use on high pressure fluid lines and adapted to fail closed comprising in combination a valve body, a reverse action gate member movably disposed within said body, a self-rising-stem which moves with said gate member and has a fluid pressure responsive area exposed to the pressure in said valve body for operating said gate member, hydraulic operator means for positioning said self-rising stem to open said valve in opposition to the reverse action provided by the pressure of the line under control, and mechanical opening means adapted to open said valve independently of said hydraulic operator means when there is no fluid pressure on said hydraulic operator means, said mechanical opening means including a screw stem, detachable coupling means between said screw stem and said self-rising stem, latch carrier means, a threaded bore through said latch carrier means within which said screw stem operates, means fixing said latch carrier means against longitudinal movement in said body only when said hydraulic operator means is not under pressure, and means fixing said latch carrier means against rotation in said body.

4. A safety control valve for use on high pressure fluid lines comprising in combination a valve body, a flow passage through said body, a gate member having a lower blind and an upper flow port, said gate member being movably disposed in said body, a self-rising stem fixed to said gate member above said flow port for movement with said gate member and extending through an opening in the wall of said body so that said gate member is normally urged to a closed position with said blind across said flow port by fluid pressure within said valve body, hydraulic operator means connected to said self-rising stem, mechanical means for positioning said self-rising stem to open said control valve only when the fluid pressure on said hydraulic operator means is insufficient to open said control valve, said mechanical opening means including a screw stem detachably fixed to the upper end of said self-rising stem, and said hydraulic operator means acting on said self-rising stem below said screw stem to open said valve when the opening force on said hydraulic operator means is great enough to overcome the closing force due to fluid pressure on said self-rising stem within said body, and snap-action means for releasing said self-rising stem from said screw stem, whereby said hydraulic operator means dominates said mechanical opening means to open said valve and hold said valve open when said opening force is greater than said closing force.

5. A self-closing reverse-action gate valve having a valve body, a gate member with a flow port and a blind, and a valve stem connected to said gate member adjacent said flow port and extending upwardly through said valve body with a fluid pressure responsive area exposed to the pressure in said valve body comprising an integrated mechanical and hydraulic operating means, hydraulic operating means comprising at least one hydraulic cylinder, a piston within said at least one hydraulic cylinder, means connecting said piston to said valve stem, said piston being arranged to exert force on said valve stem and move said valve stem inwardly of said valve body when fluid pressure is applied to said pistons, a screw stem detachably fixed to the outer end of said valve stem, a threaded block through which said screw stem operates, latch means on said block adapted to engage said valve body only when said valve is closed and restrict the outward movement of the block whereby rotation of the screw stem in one direction urges the valve stem inwardly of said valve body to open said valve, and spring-loaded latch release means actuated by the application of a force by the hydraulic system on said valve stem superior to the force of said mechanical operating means, whereby said valve may be opened by said mechanical operating means when there is no pressure fluid for said hydraulic operating means and whereby said mechanical operating means is dominated by said hydraulic operating means for opening said valve when pressure fluid is available.

References Cited in the file of this patent

UNITED STATES PATENTS

| | | |
|---|---|---|
| 2,352,140 | Trott | June 20, 1944 |
| 2,395,212 | Blanchard | Feb. 19, 1946 |
| 2,403,427 | Ludeman | July 2, 1946 |
| 2,473,013 | Crane | June 14, 1949 |
| 2,584,847 | Dahl | Feb. 5, 1952 |